INVENTORS
Harold A. Robinson
Ralph E. Friedrich
Robert S. Spencer

BY Griswold & Burdick
ATTORNEYS

July 30, 1946.  H. A. ROBINSON ET AL  2,405,055
MAGNESIUM HYDROXIDE FROM SEA WATER
Filed June 30, 1943  2 Sheets-Sheet 2

INVENTOR.
Harold A. Robinson
Ralph E. Friedrich
Robert S. Spencer
BY
Griswold & Burdick
ATTORNEYS Patented July 30, 1946

2,405,055

UNITED STATES PATENT OFFICE 2,405,055

MAGNESIUM HYDROXIDE FROM SEA WATER

Harold A. Robinson, Ralph E. Friedrich, and Robert S. Spencer, Midland, Mich., assignors to The Dow Chemical Company, Midland, Mich., a corporation of Michigan Application June 30, 1943, Serial No. 492,860

7 Claims. (Cl. 23—201)

This invention relates to methods of precipitating magnesium hydroxide from sea water, particularly when the hydroxide is produced as an intermediate stage in the preparation of magnesium chloride intended to be electrolyzed for the production of magnesium.

The general process is known, by which sea water is treated with lime to precipitate magnesium hydroxide, the precipitate is settled and separated from the spent brine by sedimentation, and finally filtered from residual brine and washed. For commercial operations it is important that the magnesium hydroxide precipitate be obtained in rapidly settling form, which also has a good filtration rate and can be washed readily. Numerous proposals have heretofore been made for securing this desirable object.

Another important consideration, when the magnesium hydroxide is to be converted into magnesium chloride for electrolysis to produce magnesium, is that the hydroxide and, in turn, the chloride shall be largely free from boron compounds. The presence of boron compounds, even in extremely small amount, in the chloride to be electrolyzed causes considerable irregularity in the electrolysis, very greatly reducing the yield of magnesium, and seriously disturbing the cell operation.

For most purposes the content of boron in sea water is negligible, being on the order of only 5 p. p. m., or approximately 0.1 per cent of the magnesium content of the sea water, calculated as $MgCl_2$. It has been found that, when magnesium hydroxide is precipitated from the sea water, it apparently adsorbs some of the boron compounds present, and such boron tends to accompany the magnesium compounds through the process of converting the hydroxide to magnesium chloride by various known methods, appearing as an impurity in the dehydrated magnesium chloride finally obtained and used for electrolysis. It is essential to reduce or limit the adsorption of boron on the precipitated magnesium hydroxide so far as possible, in order to produce from the hydroxide a chloride having a sufficiently low boron content that it can be satisfactorily electrolyzed.

Methods previously proposed for precipitating from sea water a magnesium hydroxide of high settling and filtering rate by treatment with lime or other alkali are not adapted to the present purpose, because they do not yield a product sufficiently low in boron. In some respects the conditions that we have found essential for limiting the boron content of the magnesium hydroxide are opposed to those which have hitherto been considered favorable to obtaining a precipitate of high settling rate. For example, prior methods have relied upon a gradual addition of the alkali to the sea water, usually employing a stoichiometrical deficiency of alkali to avoid the presence of calcium compounds in the precipitated magnesium hydroxide as far as possible. The boron content of magnesium hydroxide precipitated from sea water in this way is far above the permissible limit, if the hydroxide is to be converted to the chloride for use in the electrolytic production of magnesium.

Accordingly, it is an object of the invention to provide a method of precipitating magnesium hydroxide from sea water which gives a precipitate having both a reduced boron content and a high settling rate. A further object is to provide a method of the aforesaid character which is practically adapted to large scale commercial operation. Other objects and advantages will appear from the following description and annexed drawings.

We have discovered certain conditions, the observance of which is essential in precipitating magnesium hydroxide of minimum boron content from sea water. Primarily, the success of the operation depends upon maintaining a correct alkalinity of the sea water during the precipitation. The degree of alkalinity required should exceed that existing at the equivalence point, whereat the lime or other alkali added is chemically equivalent to the magnesium content of the sea water. This point corresponds to a pH value of 10.5. If less than the equivalent proportion of alkali is used, the boron content of the precipitated hydroxide will be prohibitively high for the intended purpose. On the other hand, by the use of a suitable excess over the chemically equivalent amount of alkali the magnesium hydroxide is formed with a boron content within the tolerance limit that experience has shown to be practical.

Figure 1:
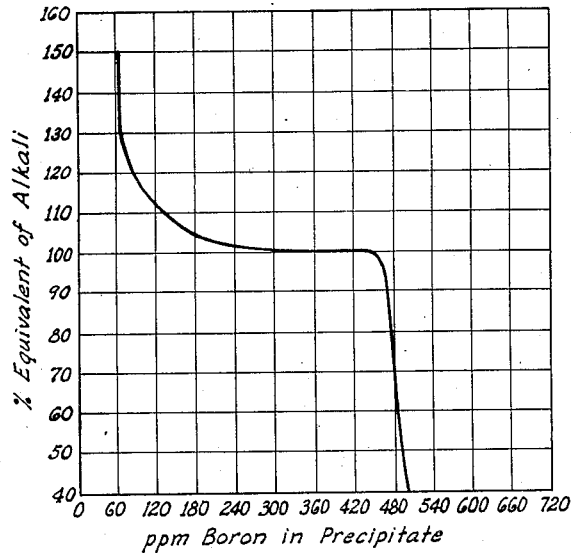
Fig. 1 is a chart showing the variation of boron content of magnesium hydroxide precipitated from sea water in accordance with the soluble alkalinity of the treated sea water.

The quantitative relationship, at 25° C., is shown by the chart, Fig. 1, in which the ordinates represent alkalinity of the aqueous phase, expressed as a percentage of the chemically equivalent quantity of alkali used to precipitate magnesium hydroxide from sea water, and the abscissae represent the boron content of the precipitate, expressed as parts per million on the basis of $MgCl_2$ equivalent to $Mg(OH)_2$ in the precipitate. This manner of expressing boron content is adopted for convenience, inasmuch as the significance of a low boron content is directly related to the use of the hydroxide for preparing magnesium chloride to be used for electrolysis to produce magnesium. The curve breaks sharply at the equivalence point (100 per cent), the boron content falling from a value of about 450 p. p. m. to about 60 p. p. m. at 130 per cent alkalinity, beyond which there is substantially no further diminution of boron content. A boron content as high as 450 p. p. m. ($MgCl_2$ basis) is prohibitive, but at about 100 p. p. m. or lower it is below the tolerance limit. Accordingly, while the operable alkalinity is just above the equivalence point and upward, the practical range is up to about 130 per cent of the chemical equivalent of alkali. At higher temperatures than 25° C. the curve is similar to that shown in Fig. 1, but is shifted to the right; hence, heating the sea water is unfavorable from the standpoint of reducing the boron content of the precipitate.

We have found, however, that the precipitate obtained by treatment of sea water of usual or normal salinity with alkali within the specified ranges of proportions has a low settling rate and is poorly adapted to commercial operations. It is important to increase the settling rate materially. According to our investigations this result is accomplished by diluting the sea water with water or brine free from dissolved magnesium salts, before or at the time of precipitation, accompanied by a suitable control of the amount of alkali, within the limits stated above, which is used for the precipitation.

The straight dilution of sea water with other water free from dissolved magnesium salts would introduce a practical disadvantage in the higher cost of handling greatly increased volumes of liquid from which the precipitated hydroxide was to be settled and separated. It would also result in a proportionate lowering of the density or concentration of the suspended particles of the precipitate, reducing the volumetric efficiency of a settling apparatus. Such disadvantages can be avoided without sacrificing the advantage of higher settling rate, however, by recirculating the treated sea water in which the magnesium hydroxide is suspended, using the recycled liquid to dilute the incoming sea water. Thus, regardless of ratio of recycled liquid to sea water, the number of suspended particles per unit volume would remain the same, other conditions being equal.

Figure 2:
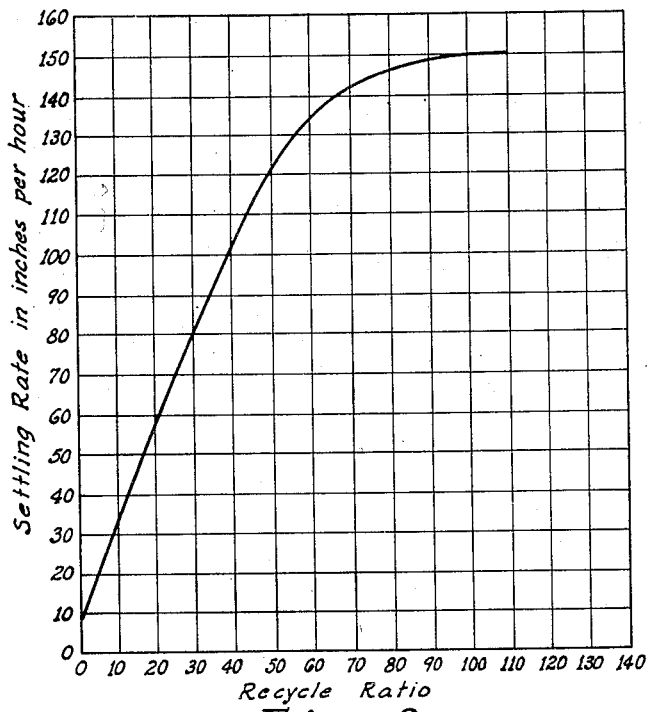
Fig. 2 is a chart showing the settling rate of magnesium hydroxide precipitated from sea water diluted to varying degrees.

The effect of such dilution upon the settling rate of the precipitate is shown by a typical curve reproduced in Fig. 2. In this curve the settling rate, in inches per hour, is plotted against the dilution expressed as recycle ratio. The precipitate was formed by treating the diluted sea water with 5 per cent excess of milk of lime. The curve rises steeply to a breaking point at a dilution of about 60/1, from which the slope falls until the curve levels off at a dilution of about 100/1.

In order to secure the indicated settling rate at any selected degree of dilution, however, a careful control of the alkalinity of the diluted and treated sea water must be maintained. As has been explained, in order to control the boron content of the magnesium hydroxide the alkalinity of the aqueous phase during precipitation from sea water should be above that of the equivalence point, i. e., above a pH of 10.5, an excess of alkali up to about 30 per cent being most advantageous. As regards the settling rate of the precipitate, however, too great an excess of alkali is unfavorable, the more so the greater the excess. This is due apparently to a change in the physical character of the precipitate formed in the presence of excess alkali, from well-defined solid particles, which settle more or less rapidly and are readily filtered, to amorphous and flocculent masses, which settle very slowly and are difficult to filter. We have found, however, that upon treating the diluted sea water with only a small excess of alkali a precipitate of good settling rate is formed, with a boron content approaching, and not greatly above, the tolerance limit. When such a precipitate is once formed and its physical character fixed by conditioning or aging for a few minutes in a detention zone, the suspension may then be treated with a further quantity of alkali to bring the excess of the latter up to as much as 30 per cent, or more, to secure a further reduction in boron content of the precipitate to a value below the tolerance limit. The second alkali addition made at this point does not reduce the settling rate of the precipitate already formed, but appears to exert a certain coagulating effect upon the finer particles in the suspension, causing them to settle faster and thus improving the settling rate of the mass as a whole.

For the primary alkali treatment of diluted sea water to obtain a precipitate having a good settling rate a 5 per cent excess of alkali is preferably employed. This amount allows a practical margin of safety to avoid the danger of temporarily underalkalizing the sea water during the mixing of the alkali with the water, while the excess of alkali is not so great as to affect unfavorably the settling rate of the precipitate. A greater excess of alkali, up to about 10 per cent, may be used for the precipitation, although with some sacrifice of the settling rate of the precipitate.

The optimum conditions for producing both a low boron content and a high settling rate of the precipitate of magnesium hydroxide are thus predicated upon a considerable dilution of the sea water, obtained by recirculating a sufficient volume of the previously treated water, and the employment of an excess of alkali for the precipitation, on the order of about 5 per cent. The actual degree of dilution to be used in any particular case is largely an economic question to be determined by finding a balance between the power cost of recirculating large volumes of liquid and the capital cost of providing settling tank capacity for the magnesium hydroxide suspension produced under any given recirculation rate. A practical figure for the recycle ratio is between 10/1 and 30/1, but either a higher or lower rate may be used, if desired. The precipitate, after its formation, is conditioned by holding in suspension for a few minutes, five or more, and a portion of the suspension is withdrawn from the recirculation system to be settled for separation of the magnesium hydroxide. This portion is subjected to a secondary treatment with alkali to raise the total excess alkali to between 15 and 30 per cent, whereby a further lowering of boron content of the hydroxide is attained, together with a further increase in settling rate, as already mentioned above.

The effect of excess alkali and of adding it to the sea water in two stages is illustrated by the following comparative tests. Three samples of sea water were diluted to about 50 volumes by mixing with previously treated suspension of magnesium hydroxide, and precipitated by addition of milk of lime with vigorous agitation. In sample No. 1 a 5 per cent excess of $Ca(OH)_2$ was added all at once; in sample No. 2 a 5 per cent excess of $Ca(OH)_2$ was added at first, followed after precipitation was complete by a second addition of 20 per cent, making a total of 25 per cent excess of $Ca(OH)_2$ over the Mg equivalent; and in sample No. 3 a 15 per cent excess of $Ca(OH)_2$ was added at first, followed by an additional 10 per cent of $Ca(OH)_2$. The settling rate of the precipitated $Mg(OH)_2$ was measured in the three samples, and the boron content of each precipitate was determined by analysis. The results of numerous repetitions of these tests are shown in the table, in which the lime addition is expressed as percentage of the theoretical Mg equivalent, the settling rate as inches per hour, and the boron as parts per million based on $MgCl_2$ equivalent of $Mg(OH)_2$.

| No. | Lime addition, per cent | | | Settling rate, inch/hr. | Boron, P. P. M. |
|---|---|---|---|---|---|
| | 1st | 2nd | Total | | |
| 1 | 105 | ------ | 105 | 80–90 | 115–140 |
| 2 | 105 | 20 | 125 | 100–170 | 80–120 |
| 3 | 115 | 10 | 125 | 30–50 | 70–80 |

Samples No. 2 represent about the optimum results for these conditions, since the settling rate is notably the highest, while the boron content is definitely lower than in samples No. 1, where no second addition of lime was made. Samples No. 3 having a higher primary lime addition, show a further decrease of boron content, but at the expense of greatly reduced settling rate, thus showing the unfavorable effect of a too high primary addition of alkali.

The alkalinity of the aqueous phase of sea water in which magnesium hydroxide has been precipitated may be expressed in different ways, according to the method of measuring it. In Fig. 1 it is expressed in terms of percentage of the alkali equivalent of Mg in the sea water. In terms of pH, the range is from 10.5, the equivalence point, to 11.5 at 130 per cent alkali equivalent. For practical purposes the alkalinity may be determined by titration with standard acid solution, and the result expressed in terms of normality. For example, a 100 cc. sample of the suspension is filtered to separate the precipitate, and the filtrate is titrated with N/10 HCl solution, to an end point with phenolphthalein indicator (pH=8.5). Each cubic centimeter of the N/10 acid required for the titration represents an alkalinity of 0.001 N. At the particular salt concentration of sea water each cubic centimeter of N/10 HCl also corresponds roughly to 1 per cent excess of alkali over the Mg equivalent of the original sea water. Thus, a titration of 5 cubic centimeters shows a normality of 0.005, and also an excess of alkali of about 5 per cent. Hence the normality corresponding to an excess of alkali up to 30 per cent over the Mg equivalent ranges from just above zero to 0.03 N. This coincidence of values is, of course, peculiar to the normal concentration of sea water and to its magnesium content. Where local conditions give rise to fresh water dilution, as at locations near fresh water inlets on the sea coast, causing a reduction in salinity of the sea water, there will be a corresponding variance between the actual normality value and the percentage excess of alkali precipitant.

Our invention is most effectively adapted to continuous operation, and for commercial production a continuous process is most economical and most susceptible of control to maintain uniformity of operating conditions. A preferred embodiment of a continuous process is shown diagrammatically in the flow sheet, Fig. 3, of the drawings.

Figure 3:
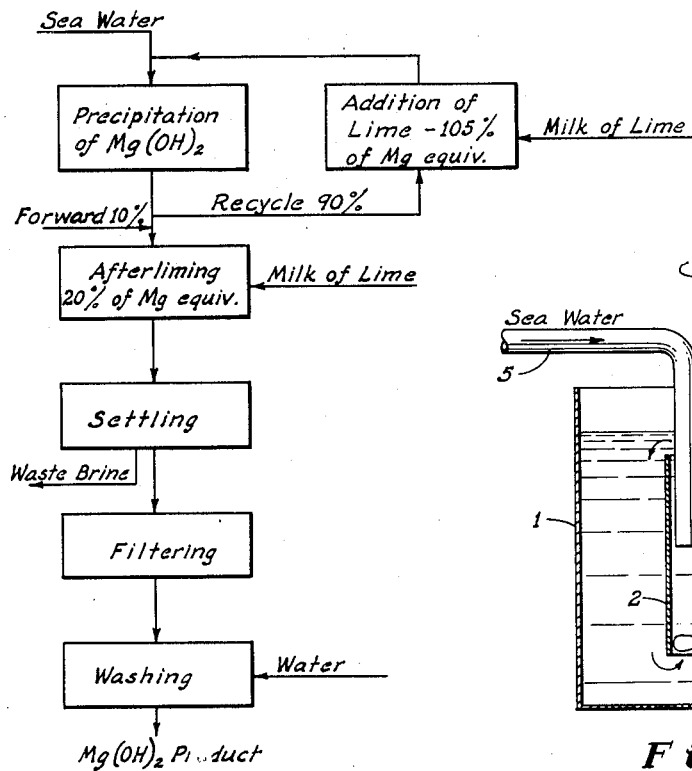
Fig. 3 is a flow sheet of the method of the invention.

Referring to Fig. 3, the raw sea water is led into a precipitation tank where it meets and is intermixed with a return flow of previously treated sea water in proportion of about one volume of sea water to ten volumes of recycled liquor, if a recycle ratio of 10/1 is maintained, the mixing being effected with vigorous agitation. The precipitating tank is maintained at a fairly constant level, serving also as an inventory and detention tank having sufficient capacity for storage of at least 5 to 20 minutes' supply of liquor. The recycled liquor introduced into this tank contains added calcium hydroxide (lime) in amount equal to approximately 105 per cent of the Mg equivalent of the sea water, so that upon intimately mixing the two streams substantially all of the magnesium salt content of the sea water is almost immediately precipitated as magnesium hydroxide. The outflow from the precipitating tank is divided, approximately 90 per cent being recycled, while sufficient milk of lime is added to it to provide the required amount of alkali for treating the entering sea water with which it is to be mixed. The remaining 10 per cent of the outflow from the precipitating tank is "afterlimed" by mixing with sufficient milk of lime to bring the total lime to about 15 to 30 per cent in excess of the Mg equivalent of the original sea water, although a larger proportion of lime, up to saturation of the liquid with $Ca(OH)_2$, may be added at this point without injuriously affecting the quality of the precipitate, but with no further advantage. Following the afterliming the treated liquor containing magnesium hydroxide in suspension is forwarded to a settling tank, such as a Dorr thickener, wherein the hydroxide is settled to form a thick magma, which is pumped from the bottom of the settling tank, having a density of from about 4 to 8 pounds $Mg(OH)_2$ per cubic foot, while the supernatant liquor overflows and is run to waste. The magma of magnesium hydroxide is then filtered and washed to free it from residual brine and soluble salts, yielding a washed product of suitable purity for further processing to convert it to magnesium chloride by any of the usual procedures.

In the method shown by Fig. 3, the mixing of the streams of sea water and of recirculated liquor may be effected by any suitable means. For purpose of illustration two methods are described, in which (1) the recirculated stream flows in an internal circuit within an inventory tank of large volume, and (2) the recirculated stream is pumped through an external circuit. Apparatus adapted to such procedures is shown diagrammatically in Figs. 4 and 5, respectively.

Figure 4:
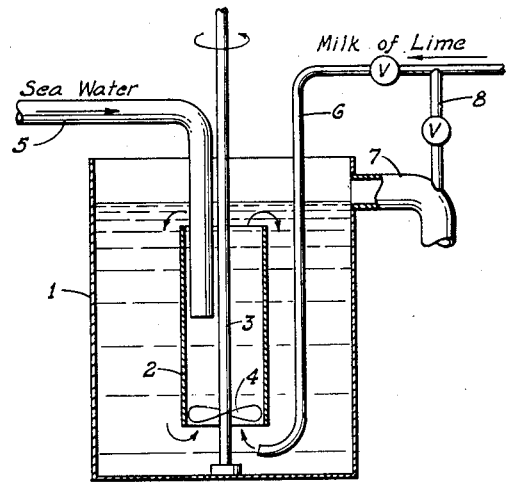
Figs. 4 and 5 represent two forms of apparatus for carrying out the method of the invention.

In Fig. 4, an inventory tank 1 is provided with a centrally located draft tube 2, within which is an axial drive shaft 3 having an impeller 4 mounted near the lower end of the draft tube. An intake pipe 5 for sea water extends into the draft tube and terminates near the mid-section thereof. A pipe 6 for introducing milk of lime depends in tank 1 in the space outside of the draft tube and terminates through a bend disposed somewhat below the lower end of the draft tube. An overflow pipe 7 serves to remove the treated liquor from the tank, a branch line 8 for introducing secondary lime connecting the lime feed pipe 6 to pipe 7.

The operation of the apparatus shown in Fig. 4 depends upon the maintenance of a large inventory in tank 1, which is kept constantly in circulation. The volume of inventory should be equal to several minutes', preferably 5 to 20, supply of incoming sea water. Impeller 4 in draft tube 2 is rotated at high speed to draw in liquor through the lower open end of tube 2 and drive it upwardly at sufficient speed for turbulent flow, discharging into the main body of liquor from the top of the tube, which is below the liquid level in the tank. The inflow of sea water through pipe 5 meets the upflow in the draft tube 2, and the confluence of the two oppositely directed streams produces a high degree of agitation and rapid mixing. Milk of lime introduced through pipe 6 below the draft tube is carried with the inrushing stream of inventory liquor into the draft tube under such conditions of agitation as to promote rapid distribution of the lime in the stream. The arrangement, therefore, provides an extremely high rate of mixing of lime, liquor and sea water, while precipitation of magnesium hydroxide occurs. Lime is introduced through pipe 6 in proportion of, preferably, about 5 per cent in excess of the Mg equivalent in the sea water, to maintain the desired degree of alkalinity. The recycle ratio in this arrangement is determined by the volume rate of flow upwardly in draft tube 2 as compared to the volume rate of inflow of sea water. The overflow through pipe 7 is equal to the inflow of sea water through pipe 5. Secondary lime addition is made through pipe 8 to the outflowing stream, to adjust its alkalinity to the desired final value.

Figure 5:
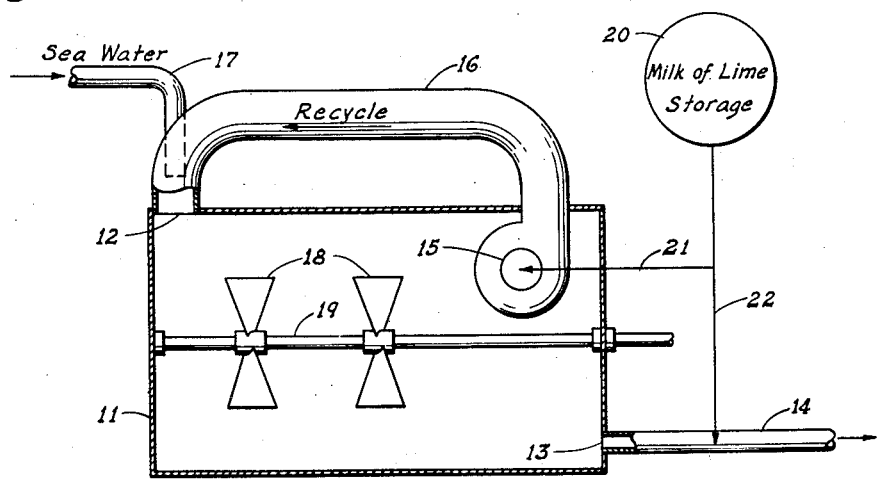

Fig. 5 shows diagrammatically in plan an apparatus for precipitating magnesium hydroxide from sea water involving the external recirculation of a portion of the treated sea water for diluting the intake. An inventory tank 11 is provided with an inlet 12 for freshly precipitated mixture and outlet 13 connected by conduit 14 with a settling tank (not shown). A pump 15 located at the opposite end of tank 11 from the inlet 12 returns a predetermined volume of treated liquor through conduit 16 back to inlet 12 with sufficient force to create a turbulent flow in the conduit. Sea water is pumped through intake pipe 17 into the recycled stream of treated liquor in conduit 16, the open end of pipe 17 being extended within the conduit in the direction of flow, so as to provide for rapid and intimate commingling of the streams. Paddle wheels 18 are mounted on shaft 19 extending lengthwise of tank 11, and are rotated at low speed just sufficient to hold the magnesium hydroxide in suspension as the liquid flows through the tank. A milk of lime storage tank 20 is connected by branching pipes 21 and 22 with the inlet of pump 15 and with the outlet conduit 14, respectively.

In the operation of the foregoing apparatus, sea water entering through pipe 17 is discharged into the turbulently flowing stream of recycled liquor in conduit 16, to which the required amount of milk of lime is added in pump 15 for precipitating all of the magnesium in the incoming sea water. The mingling streams of sea water and recycled liquor are quickly and thoroughly mixed by the conditions of turbulent flow under which they are brought together, and simultaneously precipitation of magnesium hydroxide occurs while the combined stream is flowing into the tank 11. Settling of the suspended hydroxide is prevented in tank 11 by action of the paddles 18. From the farther end of tank 11 the pump 15 withdraws the portion of liquid which is to be recycled while the volume discharged through outlet 13, under balanced operation, equals the volume of sea water entering through pipe 17. The primary addition of milk of lime, introduced into the recycled stream at pump 15 through branch line 21, is controlled closely to the optimum amount of 105 percent of the Mg equivalent of the sea water for best results. The secondary lime addition is made directly into the outflow stream in conduit 14, being on the order of about 10 to 25 per cent of the theoretical Mg equivalent of the sea water.

The settling rate of magnesium hydroxide precipitated from sea water is the resultant of numerous factors. The numerical results observed in different cases may vary more or less, depending upon ability to reproduce all conditions within reasonable limits. According to our observations dilution exerts the greatest effect, but alkalinity, within the limits hereinbefore stated, is of great importance when the alkali/Mg ratio exceeds chemical equivalency. While good settling rates can be obtained at lower ratios, these fall out of consideration for present purposes, because then the boron content of the precipitate is too high. Agitation, or rate of mixing, is a factor dependent upon engineering design of apparatus, and will vary from one type or size to another, hence can be exactly reproduced only for a particular apparatus. Detention time, or aging, is also important, but under practical conditions of operation of the method with a large enough inventory to maintain the desired rate of circulation, a sufficient time factor of about 5 minutes or more will always be provided for conditioning or aging the freshly precipitated magnesium hydroxide. Temperature is another factor, but inasmuch as temperatures rising above normal are unfavorable from the standpoint of boron content of the precipitate, for present purposes normal temperature will ordinarily be used in carrying out the treatment for precipitating magnesium hydroxide from sea water, and will be more economical. When lime is used as the alkaline precipitant, the quality of the lime will vary more or less, which is also a factor influencing settling rate.

For purpose of comparison of the effect of varying recycle rates, all other factors should be reproduced as nearly as possible. A practical demonstration was made on a large scale installation, where the volume of recirculated liquor was 200,000 gallons per minute, by varying the inflow of sea water. The entering sea water was mixed with lime in the manner shown in Fig. 5, a 5 per cent excess of lime being used, and the outflow of precipitated liquor to the settling tank was treated with an additional 15 per cent excess of lime. Comparative results are shown by the table, in which alkalinity is expressed in terms of normality of the filtered liquor, and settling rates in inches per hour.

| Recycle ratio | Alkalinity | | Settling rate | |
|---|---|---|---|---|
| | Primary | Final | Primary | Final |
| 10/1 | 0.0050 N | 0.019 N | 39 | 41 |
| 17/1 | 0.0056 N | 0.018 N | 44 | 50 |

Columns 2 and 4 refer to the results from the primary liming treatment, and columns 3 and 5 to those following the secondary liming treatment. The higher recycle ratio is seen to give a material increase of settling rate. The secondary liming, after precipitation of magnesium hydroxide and conditioning thereof has occurred, effected a further increase in settling rate.

As another illustration, two parallel tests were run for thirty days in identical apparatus of the same design as in the preceding test. The throughput in each apparatus was regulated to an average of approximately 11,500 gallons per minute, while the recycle ratio in one apparatus averaged 8.8/1, and in the other 17.5/1. The entering sea water was treated with lime in approximately 5 per cent excess over the theoretical Mg equivalent, and the outflow was after-treated with lime in amount to bring the soluble alkalinity up to approximately 0.02 N. The average results for the thirty days' operation were as follows:

| Recycle ratio | Settling rate | Density |
|---|---|---|
| 8.8/1 | 46 | 4.8 |
| 17.5/1 | 58 | 6.3 |

The settling rate is expressed in inches per hour, and density of settled magnesium hydroxide is shown in the third column expressed as pounds of $Mg(OH)_2$ per cubic foot of the aqueous sludge.

For commercial operations lime will be preferably chosen as the alkali for precipitating magnesium hydroxide from sea water, although, where cost is not excessive, an alkali metal hydroxide, e. g. caustic soda, may be used with similar results. The lime is prepared in the usual way by hydrating quicklime and making up to a slurry of convenient strength, suitably 6 to 12 pounds per cubic foot. Either a high calcium lime or dolomitic lime may be used, depending upon relative cost and availability at the plant location. Other factors being equal, dolomitic lime will have an advantage, in that its magnesium content will serve to increase the output of magnesium hydroxide obtained in operation of the process, and this additional magnesium hydroxide produced by hydration of magnesium oxide is relatively dense and has a favorable effect upon the settling rate of the combined product.

Raw sea water used in carrying out the method of our invention may be subjected to a preliminary settling, clarification, and purification by known means, if desired, for the removal of suspended and organic matter, bicarbonates, iron, etc. The removal of bicarbonates and iron is ordinarily not necessary, in the small amounts present, for preparing magnesium hydroxide intended for use in making magnesium chloride to be used in the electrolytic production of magnesium.

This application is a continuation-in-part of our prior application Serial No. 469,928, filed December 23, 1942.

We claim:

1. The method of precipitating magnesium hydroxide from sea water in a rapidly settling form having a low boron content, which comprises diluting the sea water with more than an equal volume of previously treated sea water free from dissolved magnesium salts and containing suspended magnesium hydroxide in amount at least corresponding to the original magnesium content of such sea water, adding an alkali to the mixed solutions in amount which exceeds the chemical equivalent of the dissolved magnesium salts by not more than 10 per cent, and mixing such alkali therewith by vigorous agitation to maintain in the liquid a soluble alkalinity above a pH of 10.5.

2. Method according to claim 1 in which the precipitated magnesium hydroxide is permitted to age for at least five minutes while being maintained in suspension in the liquid medium, and additional alkali is then introduced to raise the soluble alkalinity of the liquid mixture to a value above that at which the precipitation was carried out.

3. The method of precipitating magnesium hydroxide from sea water in a rapidly settling form having a low boron content, which comprises establishing a circulation of a body of sea water which has been treated with alkali to precipitate its magnesium content as magnesium hydroxide, continuously adding an alkali and untreated sea water to such circulating body in proportions such that the volume rate of flow of added sea water is less than that of the circulating liquid and the alkali exceeds the chemical equivalent of the dissolved magnesium salts in the added sea water by not more than 10 per cent, continuously withdrawing a portion of the liquid suspension equal to that of the added sea water, and separating magnesium hydroxide from such withdrawn portion.

4. Method according to claim 3 in which additional alkali is introduced into the continuously withdrawn portion of the suspension to raise the soluble alkalinity of the liquid to a value above that at which the precipitation was carried out.

5. The method of precipitating magnesium hydroxide from sea water in a rapidly settling form having a low boron content, which comprises establishing a circulation of a liquid suspension of magnesium hydroxide formed by treatment of sea water with an alkali in excess of the magnesium equivalent thereof, dispersing lime in the circulating suspension, introducing sea water thereinto in proportion such that the lime content of the dispersion is maintained in excess of the magnesium content of the added sea water by not more than 10 per cent, withdrawing a portion of the liquid mixture equal to that of the added sea water, introducing sufficient lime into such withdrawn portion to raise the soluble alkalinity of the liquid medium to a value above that at which the precipitation was carried out, and separating magnesium hydroxide from such withdrawn portion.

6. The method of precipitating magnesium hydroxide from sea water in a rapidly settling form having a low boron content, which comprises establishing a circulation of a liquid suspension of magnesium hydroxide formed by treatment of sea water with lime in excess of the magnesium equivalent thereof, dispersing lime slurry in the circulating suspension, introducing sea water thereinto in proportion such that the lime content of the dispersion is maintained approximately 5 per cent in excess of the magnesium content of the added sea water, and the volume rate of inflow of the latter is less than 10 per cent of the volume rate of flow of the circulating suspension, withdrawing a portion of the liquid mixture equal in volume to that of the added sea water, adding sufficient lime slurry to the withdrawn portion to raise the soluble alkalinity thereof to a value of about 0.015 N to 0.03 N, and separating magnesium hydroxide therefrom.

7. The method of precipitating magnesium hydroxide from sea water in a rapidly settling form having a low boron content, which comprises continuously and separately introducing sea water and lime slurry with vigorous agitation into a stream of a liquid suspension of magnesium hydroxide formed by previously liming sea water in similar manner, the proportions of sea water and lime slurry being such that the lime exceeds the magnesium equivalent of the sea water by approximately 5 per cent, collecting the combined streams in a detention zone in which the magnesium hydroxide is maintained in suspension for at least five minutes, recirculating a portion of the suspension having a volume ratio of 10/1 or more compared to the inflowing sea water for mixing with sea water in said first step, withdrawing from the detention zone another portion of the suspension at a rate equal to the inflow of sea water, adding lime slurry to such withdrawn portion to adjust its soluble alkalinity to a value of about 0.015 N to 0.03 N, and separating magnesium hydroxide therefrom.

HAROLD A. ROBINSON.
RALPH E. FRIEDRICH.
ROBERT S. SPENCER.